J. M. Scott.
Mechanical Movement.
Nº 72915.  Patented Dec. 31, 1867.
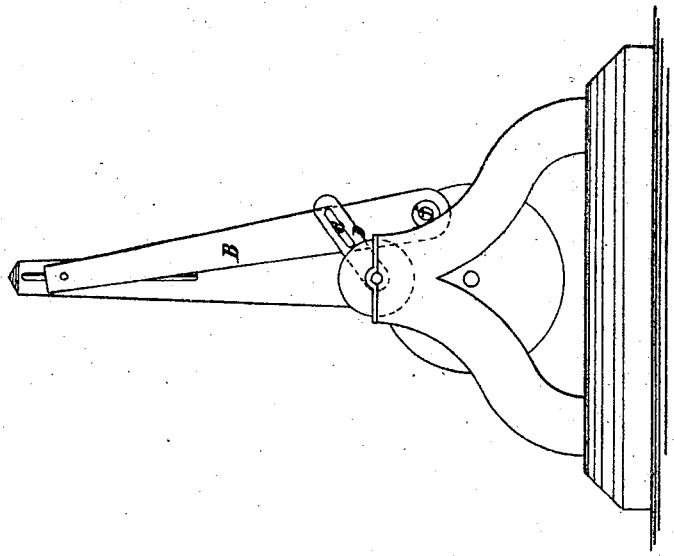
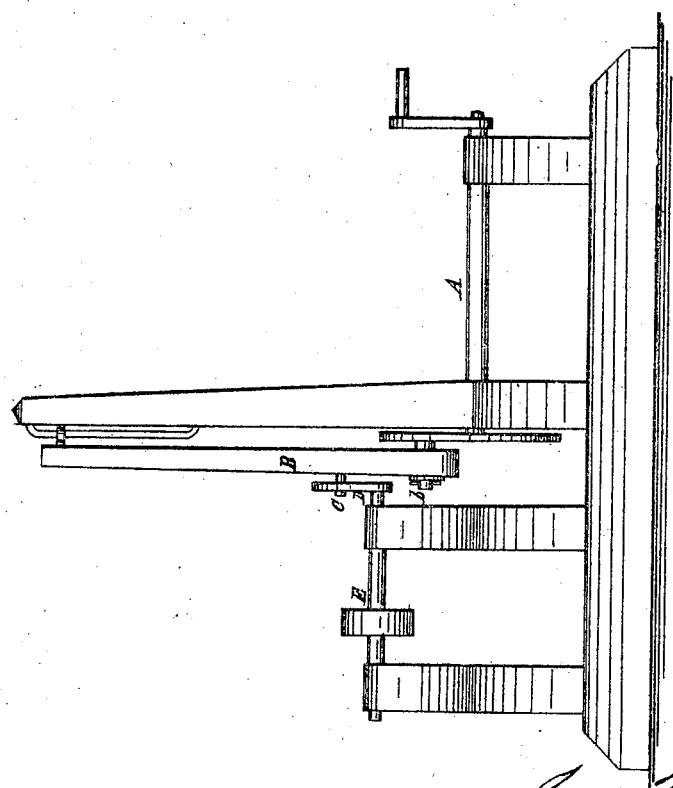

United States Patent Office.

JAMES M. SCOTT, OF KINSMAN, OHIO.

Letters Patent No. 72,915, dated December 31, 1867.

IMPROVEMENT IN MECHANICAL MOVEMENTS.

*The Schedule referred to in these Letters Patent and making part of the same.*

TO ALL WHOM IT MAY CONCERN:

Be it known that I, JAMES M. SCOTT, of Kinsman, in the county of Trumbull, and State of Ohio, have invented a new and improved Rotary Feed for Saw-Mills; and I do hereby declare that the following is a full, clear, and exact description thereof, which will enable others skilled in the art to make and use the same, reference being had to the accompanying drawings, forming part of this specification.

This invention relates to an improved rotary feed for saw-mills.

It has hitherto been found impossible to procure a rotary motion from the pitman of a saw-mill; this is obtained by my invention, and is intended to be applied to feed the mill.

The accompanying drawing is a perspective view of my improved rotary feed.

A is the shaft of the water-wheel or rotary shaft connected with any other source of power. B is the pitman, eccentrically connected at B. A pin, $c$, works in the slotted crank D, causing it to revolve, and imparting a rotary motion to the feed-shaft E, affording a continuous and reliable feed to the saw.

I claim as new, and desire to secure by Letters Patent—

The feed-shaft E, slotted crank D, and pin $c$, in combination with the pitman B and shaft A, arranged and operating in manner and for the purposes substantially as described.

JAMES M. SCOTT.

Witnesses:
CHARLES FITCH,
R. K. HULSE.